United States Patent
Lents et al.

(10) Patent No.: US 7,753,036 B2
(45) Date of Patent: Jul. 13, 2010

(54) COMPOUND CYCLE ROTARY ENGINE

(75) Inventors: Charles E. Lents, Amston, CT (US); Stephen P. Zeppieri, Glastonbury, CT (US); Roy N. Guile, Wethersfield, CT (US); Vincent C. Nardone, South Windsor, CT (US); Jonathan Lauter, Great Neck, NY (US); Arindam Dasgupta, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/824,645

(22) Filed: Jul. 2, 2007

(65) Prior Publication Data

US 2009/0007882 A1    Jan. 8, 2009

(51) Int. Cl.
*F02B 33/00*    (2006.01)
(52) U.S. Cl. .................................................. 123/559.1
(58) Field of Classification Search ............... 123/559.1
See application file for complete search history.

(56) References Cited

U.S. PATENT DOCUMENTS

| | | | | |
|---|---|---|---|---|
| 2,344,993 A * | 3/1944 | Lysholm | ...................... | 123/564 |
| 2,670,595 A * | 3/1954 | Miller | ......................... | 123/297 |
| 3,405,692 A * | 10/1968 | Paschke | ...................... | 123/213 |
| 4,315,488 A * | 2/1982 | Tadokoro et al. | ............. | 123/213 |
| 4,586,337 A * | 5/1986 | Fox | ........................... | 60/605.1 |
| 4,878,464 A * | 11/1989 | Richeson et al. | .......... | 123/90.11 |
| 5,050,378 A * | 9/1991 | Clemmens | ................... | 60/313 |
| 5,056,315 A * | 10/1991 | Jenkins | ......................... | 60/614 |
| 5,251,595 A * | 10/1993 | Wei-Min | ...................... | 123/237 |
| 5,251,596 A * | 10/1993 | Westland | ..................... | 123/242 |
| 5,323,610 A * | 6/1994 | Fransson et al. | ............... | 60/339 |
| 5,357,936 A * | 10/1994 | Hitomi et al. | ............... | 60/605.2 |
| 5,433,179 A * | 7/1995 | Wittry | ......................... | 123/245 |
| 5,622,149 A * | 4/1997 | Wittry | ......................... | 123/245 |
| 5,845,613 A * | 12/1998 | Yoshikawa | ............... | 123/90.15 |
| 6,237,560 B1* | 5/2001 | Saito | ........................... | 123/243 |
| 6,343,473 B1* | 2/2002 | Kanesaka | ..................... | 60/609 |
| 6,931,850 B2* | 8/2005 | Frank et al. | .................... | 60/608 |
| 6,951,211 B2* | 10/2005 | Bryant | ..................... | 123/559.1 |
| 7,077,082 B2* | 7/2006 | Bloms et al. | ............. | 123/90.12 |
| 7,252,054 B2* | 8/2007 | Weber et al. | ............. | 123/559.1 |
| 7,281,527 B1* | 10/2007 | Bryant | ........................ | 123/564 |

(Continued)

FOREIGN PATENT DOCUMENTS

JP    55153820 A  *  12/1980

(Continued)

*Primary Examiner*—Thomas E Denion
*Assistant Examiner*—Mary A Davis
(74) *Attorney, Agent, or Firm*—Bachman & LaPointe, P.C.

(57) ABSTRACT

A compound cycle engine system has a rotary engine, which rotary engine generates exhaust gas. The system further has a compressor for increasing the pressure of inlet air to be supplied to the engine to a pressure in the range of from 3.0 to 5.0 atmospheres and an intercooler for providing the inlet air to the engine at a temperature in the range of from 150 to 250 degrees Fahrenheit. The system further has one or more turbines for extracting energy from the exhaust gas. The Miller Cycle is implemented in the rotary engine, enabling the compression ratio to be lower than the expansion ratio, allowing the overall cycle to be optimized for lowest weight and specific fuel consumption.

27 Claims, 2 Drawing Sheets

U.S. PATENT DOCUMENTS

| | | | |
|---|---|---|---|
| 2003/0200955 A1* | 10/2003 | zur Loye et al. | 123/435 |
| 2004/0177837 A1* | 9/2004 | Bryant | 123/559.1 |
| 2005/0098162 A1* | 5/2005 | Bryant | 123/559.1 |
| 2005/0115547 A1* | 6/2005 | Bryant | 123/559.1 |
| 2005/0229901 A1* | 10/2005 | Weber et al. | 123/316 |
| 2006/0123784 A1* | 6/2006 | Algrain | 60/608 |
| 2007/0144175 A1* | 6/2007 | Sopko et al. | 60/605.1 |
| 2008/0121218 A1* | 5/2008 | Algrain | 123/565 |

FOREIGN PATENT DOCUMENTS

| | | | |
|---|---|---|---|
| JP | 02211318 A | * | 8/1990 |
| JP | 07091265 A | * | 4/1995 |

* cited by examiner

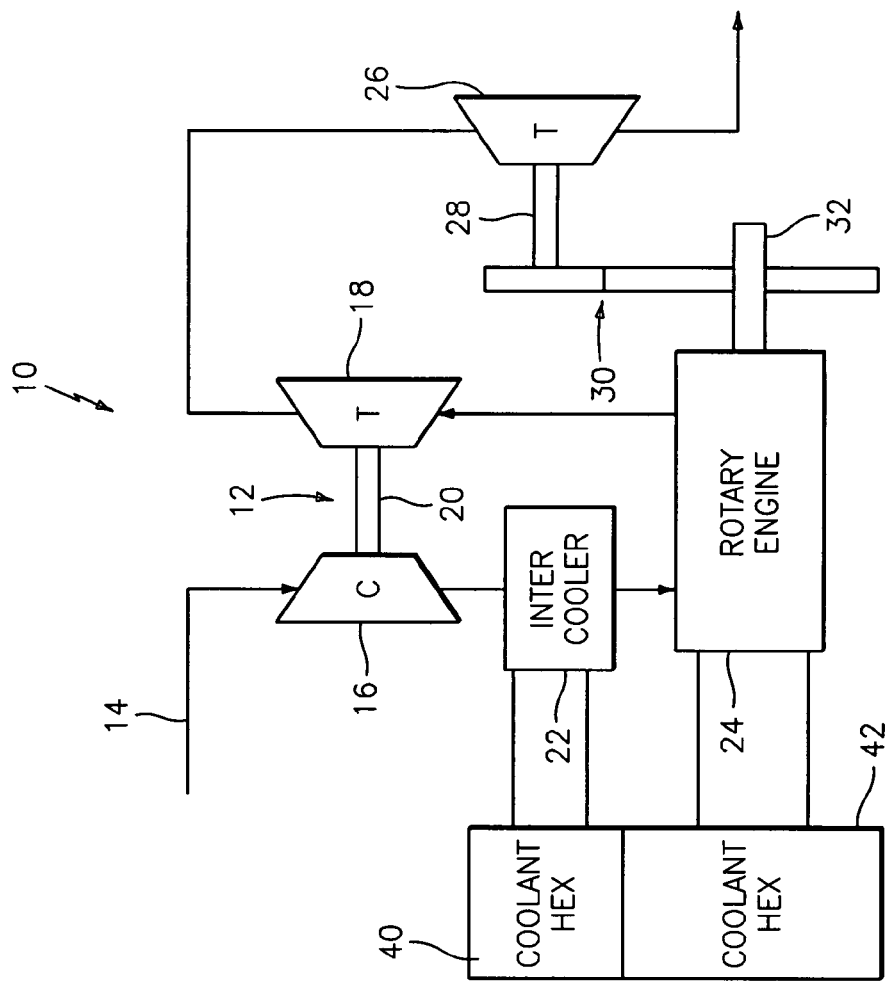
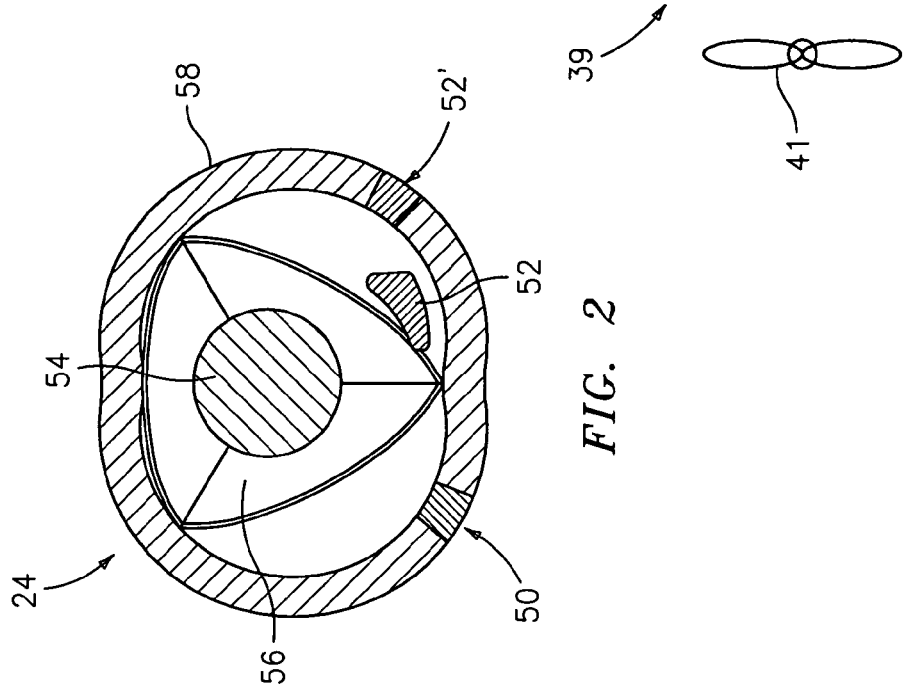
FIG. 1
FIG. 2

COMPOUND CYCLE ROTARY ENGINE

BACKGROUND (1) Field of the Invention

The present disclosure relates to a compound cycle rotary engine that offers low specific fuel consumption at high power to weight. The compound cycle rotary engine has particular utility for propulsion systems.

(2) Prior Art

Gas turbine engines in the 500 to 3000 shaft horsepower range are well known for having very high power to weight (power produced per unit weight), but at high specific fuel consumption (fuel flow rate per unit power, SFC). Intermittent combustion engines (e.g. spark ignition, or SI, reciprocating engines and compression ignition, or CI, reciprocating engines) are well known for having low SFC, but at low power to weight. It is desirable to achieve low SFC at high power to weight. A compound engine cycle which combines certain features of both engine types has the potential to achieve low specific fuel consumption at relatively high power to weight.

Compound engine cycles are well documented in the literature and textbooks. In a typical compound cycle engine, energy is extracted from the exhaust stream of a reciprocating engine by expanding the exhaust gas through a turbine. The turbine drives a shaft that is linked through a gearbox or fluid coupling to the main engine output shaft, thus increasing the total system power output. The reciprocating engine is typically otherwise conventional in nature and may be either a CI or SI engine. In addition to the compound cycle turbine, conventional turbochargers may be fitted in essentially the same manner as they are to non-compound cycle engines. Turbochargers are used to increase the power and/or efficiency of an engine. Intercoolers may also be fitted to increase charge density and/or control combustion temperatures. Variations on this configuration are also well documented.

Previous attempts have been made to develop a compound cycle engine (CCE) utilizing a compression ignition (CI) reciprocating engine core. While these engines have been successful in achieving low SFCs (around 0.33 lbm/hr/hp), they have not achieved high power to weight (exceeding 2.0 hp/lbm). This is due primarily to the reciprocating masses (pistons), valves and combustion systems inherent in a CI engine that limits the engine's ability to operate at high speed. The higher the engine operating speed, the more power that can be produced for a given volume and thus the higher the power to weight. Also, the chamber pressures and temperatures at which CI engines operate require heavy structures for containment.

Thus, there remains a need for a compound cycle engine which is capable of achieving low specific fuel consumption at relatively high power to weight.

SUMMARY

There is provided a compound cycle engine system which is capable of achieving low specific fuel consumption at relatively high power to weight. The compound cycle engine system broadly comprises a rotary engine, which rotary engine generates an exhaust gas, means for supplying inlet air at a pressure in the range of from 3.0 to 5.0 atmospheres and a temperature in the range of from 150 to 250 degrees Fahrenheit to the rotary engine, and means for extracting energy from the exhaust gas from the rotary engine.

Other details of the compound cycle rotary engine system, as well as other objects and advantages attendant thereto, are set forth in the following detailed description and the accompanying drawing wherein like reference numerals depict like elements.

BRIEF DESCRIPTION OF THE DRAWINGS

FIG. 1 is a schematic representation of a compound cycle rotary engine; and

FIG. 2 is a sectional view of a rotary engine which may be used in the compound cycle rotary engine of FIG. 1.

DETAILED DESCRIPTION OF THE PREFERRED EMBODIMENT(S)

Figure 3:
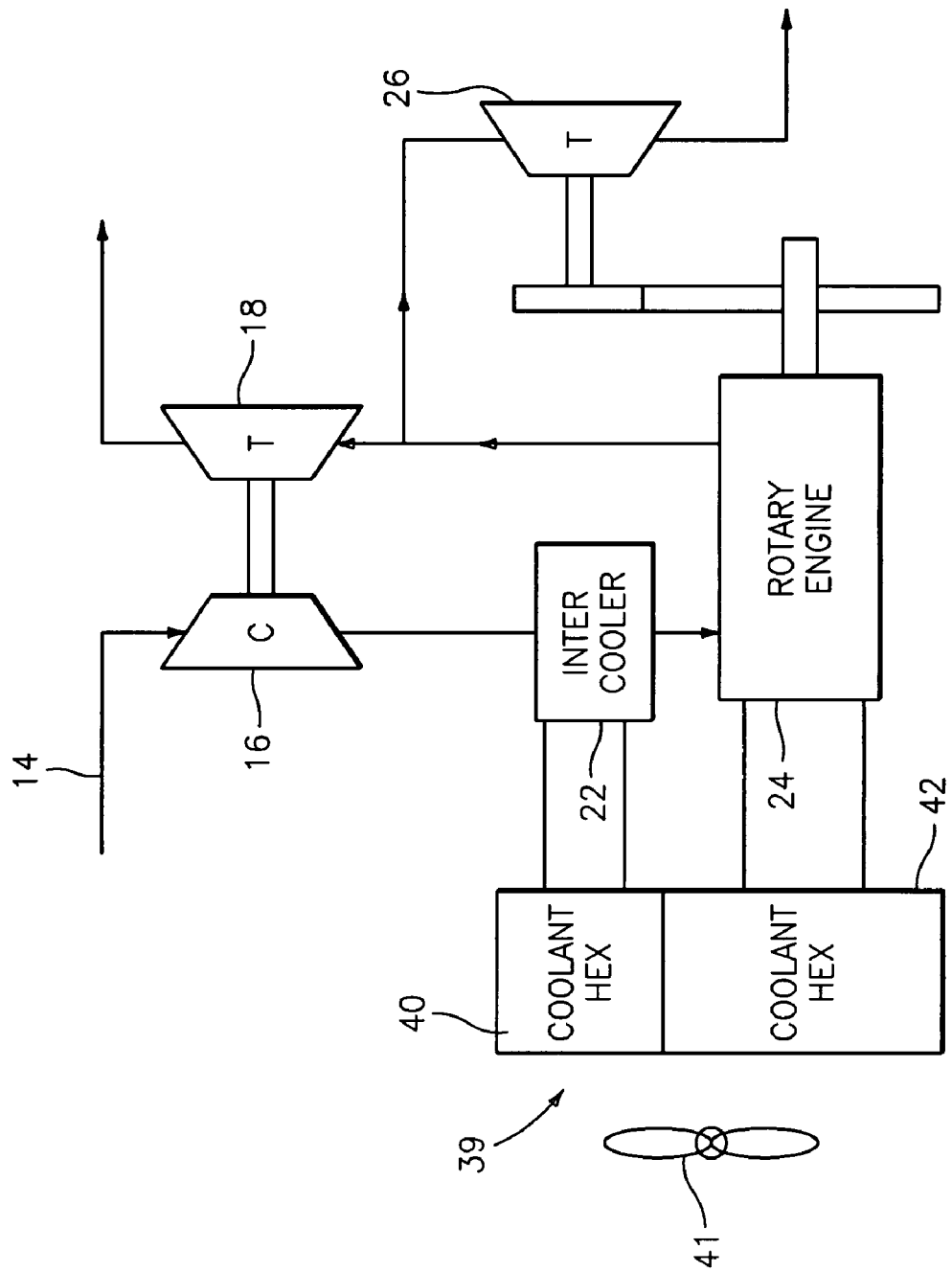
FIG. 3 is a schematic representation of an alternative compound cycle rotary engine.

Referring now to FIG. 1, there is shown a compound engine cycle 10 which includes a turbocharger 12 that receives air from an inlet 14. The turbocharger 12 includes a compressor 16 and a turbine 18 which are connected by a shaft 20. The compressor 16 may be a single- or multiple-stage centrifugal device and/or an axial device. The air from the inlet 14 flows into the compressor 16. The compressor 16 preferably increases the pressure of the air flow to a level in the range of from 3.0 to 5.0 atmospheres.

The air exiting the compressor 16 flows into an intercooler 22 where the temperature of the air is lowered to a relatively low level, i.e. the air exiting the intercooler 22 and entering the inlet of a rotary engine 24 is in the range of from 150 to 250 degrees Fahrenheit. As a result of passing the inlet air through the compressor 16 and the intercooler 22, a very high density inlet air can be supplied to the inlet of the rotary engine 24. A rotary engine 24 with such high inlet air density can produce high power in a small engine volume. The rotary engine 24 may be any suitable rotary engine known in the art. For the desired range of horsepower, i.e. 500 to 3000 hp, the rotary engine displacement may range from 1 liter to 10 liters. It should be noted that conventionally turbocharged engines of these displacements would produce less than half the power of the proposed engine cycle 10.

The exhaust gas exiting the rotary engine 24 is supplied to two turbines, a compressor turbine 18 and a power turbine 26, the turbines being either in series or in parallel. In the series arrangement, exhaust gas flows first through one of the two turbines where the pressure is reduced, and then through the other turbine, where the pressure is further reduced. In the parallel arrangement, as shown in FIG. 3, the exhaust gas is split and supplied to each turbine 18, 26 at same pressure and the pressure is reduced by the same amount in each turbine. The series arrangement is shown in FIG. 1. Energy is extracted from the exhaust gas by the compressor turbine 18 and may be used to drive the compressor 16 via the shaft 20. Energy is extracted from the exhaust air flow by the power turbine 26 and may be used to drive an output shaft 28. The output shaft 28 may be connected via a gear system 30 to a shaft 32 connected to the rotary engine 24. The combined output on shaft 32 may be used to provide propulsive power to a vehicle application into which the engine is integrated. This power may be delivered through a gearbox (not shown) that conditions the output speed of the shaft 32 to the desired speed on the application. Alternatively, the output shaft 28 may be used to provide power to an electric generator (not shown) while the shaft 32 may be used to provide propulsive power to a vehicle application. In yet another alternative, both output shafts 28 and 32 may be used to drive separate electric generators. Exhaust gas exiting the turbines may be discharged in any suitable manner. Typically, the exhaust gas would be discharged to the ambient at a lower temperature than either a gas turbine or diesel engine due to the power extracted at the power turbine 26.

The rotary engine 24 forms the core of the compound cycle engine system 10. In a preferred embodiment, the rotary engine 24 operates with its compression ratio lower than its expansion ratio, which is known as the Miller cycle, such that the exhaust and intake pressures are held to similar values (within approximately 0.5 atm.), and with a high temperature engine block cooling system. As shown in FIG. 2, the rotary engine 24 has an eccentric shaft 54 and a rotor 56 which moves within a housing 58. The rotor 56 may be connected to the shaft 54 by any suitable gear arrangement known in the art. The rotary engine 24 has an inlet port 52 for admitting air to the interior of the housing 58, a fuel injection port (not shown) for delivering fuel into the housing 58 after the charge air has been compressed and an exhaust port 50 for exhausting a gas. Fuel is delivered into the combustion chamber such that the chamber is stratified with a rich fuel-air mixture near the ignition source and a leaner mixture elsewhere. The fuel-air mixture may be ignited within the housing 58 using any suitable ignition system known in the art. In another embodiment, fuel and air would be mixed outside the engine and delivered as a pre-mixed charge to the inlet port 52.

The engine cycle 10 may be provided with a block cooling system 39 which has a fan 41, a coolant heat exchanger 40 connected to the intercooler 22, and a coolant heat exchanger 42 connected to the rotary engine 24. Running the block cooling system 39 at a high temperature results in a lower weight cooling system and keeps more heat in the cycle. This is especially important in the compound engine cycle where rotary engine exhaust gases are used to power the downstream turbines. Turbine performance is enhanced by supplying exhaust from the rotary engine 24 at a pressure close to the inlet pressure. Performance of the rotary engine 24 is enhanced by supplying intake air from the compressor 16 at a pressure close to or slightly greater than the exhaust pressure. Miller cycle operation of the rotary engine 24 is important as it allows the engine to accept intake air at a pressure of similar magnitude to the high exhaust pressure caused by the downstream turbines. In some applications, it may be desirable for the rotary engine exhaust pressure to be either higher or lower than the inlet pressure. The ability to independently tailor the compression and expansion ratios of the rotary engine 24, as enabled by the implementation of the Miller cycle allows the rotary engine exhaust pressure to be chosen for the optimal combination of overall system power to weight and SFC.

The Miller cycle can be implemented in the rotary engine 24 by moving the location of the inlet port 52 around the periphery of the engine to the location 52' and to a different crank angle as shown in FIG. 2. In a reciprocating diesel engine, the Miller cycle may be implemented by delaying the intake valve closing event. Thus, the rotary engine 24 simplifies implementation of the Miller cycle by replacing complicated valve timing with a simple geometry change.

One of the aims of the engine system 10 is to retain cycle heat in the exhaust gas leaving the rotary engine 24. This is so the retained heat can be turned into useful work in the turbine 18 and the power turbine 26. The exhaust gases exit the rotary engine 24 at approximately the same pressure at which the inlet air is supplied to the rotary engine 24, i.e. from 3.0 to 5.0 atmospheres.

The rotary engine 24 is preferably operated to drive exhaust gas temperature to a range of from 1500 to 1800 degrees Fahrenheit. This may be accomplished by using thermal barriers, high temperature cooling and insulation, and/or Miller cycle port timing.

It is desirable to limit the peak cycle pressure in the rotary engine to a range of from 1200 to 1800 psia. The size of the engine is determined by the expansion ratio required to drop the pressure from this peak to the desired exhaust pressure. The inlet port angle, relative to the exhaust port angle, can then be determined to achieve the desired peak cycle pressure given the inlet air pressure. This will generally result in an inlet port that closes later than in ordinary rotary engines. With the increased inlet pressure, the area of the inlet port may be slightly smaller than the inlet port of ordinary rotary engines.

Typical inlet/exhaust angles for a non-Miller cycle engine compared to a Miller cycle engine in accordance with the present invention are shown in the following table. In the following table, the angles refer to the angular position of the crankshaft relative to its positions corresponding to either minimum chamber volume (top dead center, TDC) or maximum chamber volume (bottom dead center, BDC). ATDC means "After Top Dead Center", BTDC means "Before Top Dead Center," ABDC means "After Bottom Dead Center," and BBDC means "Before Bottom Dead Center."

TABLE I

| Engine Type | Intake Port Opens | Intake Port Closes | Exhaust Port Opens | Exhaust Port Closes |
|---|---|---|---|---|
| Conventional | 3-35 deg ATDC (side port) | 30-70 deg ABDC (side port) | 70-75 deg BBDC | 38-48 deg ATDC |
| Conventional (Racing) | 80-120 deg BTDC (Peripheral Port) | 70-90 deg ABDC (peripheral port) | 70-90 deg BBDC | 48-65 deg ATDC |
| Miller Cycle | 0-15 deg ATDC | 115-140 deg ABDC | 70-90 deg BBDC | 38-65 deg ATDC |

The significant difference between a conventional rotary engine and a Miller cycle rotary engine is the intake port opening/closing timing. Other port events may be chosen within the conventional range depending on the application of the engine.

It should be noted that the delayed intake port closing, smaller inlet area, and thus even more delayed opening, allows much less inlet charge to dilute the exhaust gas than in current practice, this driving up the exhaust gas temperature.

The compression ratio of the compressor may be in the range of from 3.0:1 to 5.0:1 and, the expansion ratio of the turbine may be in the range of 2.0:1 to 7.0:1. Suitable ranges for the internal volumetric compression and expansion ratios of the engine are given in the table below.

TABLE II

| Engine Type | Internal Effective Comp. Ratio | Internal Effective Exp. Ratio |
|---|---|---|
| Conventional | 7.0:1-11.0:1 | Same as compression ratio |
| Miller Cycle | 2.0:1-6.0:1 | 7.0:1-11.0:1 |

It should be noted that a significant difference between a conventional rotary engine and the rotary engine 24, is that the Miller cycle allows having an effective compression ratio that is fundamentally different than the expansion ratio.

The concept of the engine described herein is enhanced by a high temperature block cooling system for two reasons. Foremost, the block cooling system represents a significant fraction of the total system weight. Also, the colder the coolant, the more heat that may be conducted from the working gases into the coolant. The high temperature block cooling system will drive weight out of the system and retain heat in the cycle and thus increase exhaust gas temperature. High performance cooling systems now operate near 220 degrees Fahrenheit. The rotary engine described herein will drive the temperature up to 250 degrees Fahrenheit as this will retain approximately 1.0 to 3.0% more heat in the cycle and is the practical limit for ethylene glycol (the coolant of choice for good heat transfer) to avoid vaporization of the coolant and dry out in the engine block.

There are a range of applications that require propulsion systems in the 500 hp to 3000 hp shaft power range. These include turboprop aircraft, midsized manned and unmanned rotorcraft, military ground vehicles (tanks and armored personnel carriers) and watercraft (both military and pleasure marine). Current propulsion systems for these applications sacrifice specific fuel consumption (fuel flow rate per unit power) in order to achieve high power to weight or vice-versa. The compound cycle rotary engine described herein addresses these applications and may be used as a propulsion system for these applications.

It is apparent that there has been provided a compound cycle rotary engine which fully satisfies the objects, means, and advantages set forth hereinbefore. While the compound cycle rotary engine has been described in the context of specific embodiments thereof, other unforeseeable alternatives, modification, and variations may become apparent to those skilled in the art having read the foregoing description. Accordingly, it is intended to embrace those alternatives, modifications, and variations which fall under the broad scope of the appended claims.

What is claimed is:

1. A compound cycle engine system comprising:
a rotary engine having a displacement of from 1 to 10 liters, said rotary engine generating exhaust gas;
said rotary engine being operated so that intake and exhaust pressures are within 0.5 atmospheres;
said rotary engine having an intake port and an exhaust port;
said intake and exhaust ports being arranged so that said engine has a cycle in which an internal expansion volume is greater than an internal compression volume;
means for supplying inlet air at a pressure in the range of from 3.0 to 5.0 atmospheres and a temperature in the range of from 150 to 250 degrees Fahrenheit to said rotary engine;
said air supplying means comprising a compressor;
a first turbine connected to the compressor by a shaft, said first turbine receiving said exhaust gas from said engine and reducing exhaust gas pressure;
a second turbine having an output shaft, said second turbine receiving said exhaust gas and having an expansion ratio in the range of 2.0:1 to 7.0:1; and
said engine having a power shaft and said output shaft of said second turbine being connected to said power shaft.

2. The compound cycle engine system according to claim 1, wherein said compressor raises the pressure of said inlet air to said 3.0 to 5.0 atmospheres and said air supplying means further comprises an intercooler for receiving said inlet air at said raised pressure from said compressor and for lowering the temperature of said inlet air to said 150 to 250 degree Fahrenheit range.

3. The compound cycle engine system according to claim 1, wherein said output shaft is connected to said power shaft via a gear arrangement.

4. The compound cycle engine system according to claim 1, wherein said intake port opens at 0 to 15 degrees after top dead center and closes at 115-140 degrees after bottom dead center.

5. The compound cycle engine system according to claim 1, wherein said compressor has a compression ratio in the range of from 3.0:1 to 5.0:1.

6. The compound cycle engine system according to claim 1, wherein said rotary engine has a cooling system which operates at a temperature up to 250 degrees Fahrenheit.

7. The compound cycle engine system according to claim 1, wherein said rotary engine maintains a peak cycle pressure in the range of from 1200 to 1800 psia.

8. The compound cycle engine system according to claim 1, wherein said exhaust gas has a temperature in the range of from 1500 to 1800 degrees Fahrenheit.

9. The compound cycle engine system according to claim 1, wherein said exhaust gas has a pressure in the range of from 3.0 to 5.0 atmospheres.

10. A compound cycle engine system comprising:
a rotary engine, said rotary engine generating exhaust gas;
means for supplying inlet air at a pressure in the range of from 3.0 to 5.0 atmospheres and a temperature in the range of from 150 to 250 degrees Fahrenheit to said rotary engine;
said air supplying means comprising a compressor;
means for extracting energy from said exhaust gas;
said energy extracting means comprising a first turbine connected to the compressor by a shaft which receives said exhaust gas from said engine;
said energy extracting means comprising a second turbine having an output shaft, said second turbine receiving said exhaust gas from an outlet of said first turbine, and said second turbine has an expansion ratio in the range of 2.1:1 to 7.0:1;
said engine has a power shaft and said output shaft being connected to said power shaft;
said rotary engine being a Miller cycle rotary engine;
said rotary engine having an intake port and an exhaust port;
said intake and exhaust ports being arranged so that said engine has a cycle in which an internal expansion volume is greater than an internal compression volume;
said engine having an intake port which opens opening at 0 to 15 degrees after top dead center and which closes closing at 115-140 degrees after bottom dead center; and
said engine having an exhaust port which opens opening at 70 to 90 degrees before bottom dead center.

11. The compound cycle engine system according to claim 10, wherein said exhaust port closes at 38 to 65 degrees after top dead center.

12. The compound cycle engine system according to claim 10, wherein said rotary engine has a displacement in the range of 1.0 liter to 10 liters.

13. A vehicle having a propulsion system, which propulsion system comprises a compound cycle engine system comprising:
a rotary engine having a displacement of from 1 to 10 liters, said rotary engine generating exhaust gas;
said rotary engine being operated so that intake and exhaust pressures are within 0.5 atmospheres;
said rotary engine having an intake port and an exhaust port;
said intake and exhaust ports being arranged so that said engine has a cycle in which an internal expansion volume is greater than an internal compression volume;

means for supplying inlet air at a pressure in the range of from 3.0 to 5.0 atmospheres and a temperature in the range of from 150 to 250 degrees Fahrenheit to said rotary engine;

said air supplying means comprising a compressor;

means for extracting energy from said exhaust gas;

said energy extracting means comprising a first turbine connected only to the compressor by a shaft, which said first turbine receives said exhaust gas from said engine;

said energy extracting means comprising a second turbine having an output shaft, said second turbine receiving said exhaust gas from an outlet of said first turbine, and said second turbine has an expansion ratio in the range of 2.1:1 to 7.0:1; and said engine has a power shaft and said output shaft being connected to said power shaft.

14. The vehicle according to claim 13, wherein said compressor raises the pressure of said inlet air to said 3.0 to 5.0 atmospheres and said air supplying means further comprises an intercooler for receiving said inlet air at said raised pressure from said compressor and for lowering the temperature of said inlet air to said 150 to 250 degree Fahrenheit range.

15. The vehicle according to claim 13, wherein said output shaft is connected to said power shaft via a gear arrangement.

16. The vehicle according to claim 13, wherein said intake port opens at 0 to 15 degrees after top dead center and closes at 115-140 degrees after bottom dead center.

17. The vehicle according to claim 16, wherein said exhaust port opens at 70 to 90 degrees before bottom dead center.

18. The vehicle according to claim 17, wherein said exhaust port closes at 38 to 65 degrees after top dead center.

19. The vehicle according to claim 13, wherein said compressor has a compression ratio in the range of from 3.0:1 to 5.0:1.

20. The vehicle according to claim 13, wherein said rotary engine has a cooling system which operates at a temperature up to 250 degrees Fahrenheit.

21. The vehicle according to claim 13, wherein said rotary engine maintains a peak cycle pressure in the range of from 1200 to 1800 psia.

22. The vehicle according to claim 13, wherein said exhaust gas has a temperature in the range of from 1500 to 1800 degrees Fahrenheit.

23. The vehicle according to claim 13, wherein said exhaust gas has a pressure in the range of from 3.0 to 5.0 atmospheres.

24. The vehicle according to claim 13, wherein said vehicle comprises an aircraft.

25. The vehicle according to claim 13, wherein said vehicle comprises a rotorcraft.

26. The vehicle according to claim 13, wherein said vehicle comprises a ground vehicle.

27. The vehicle according to claim 13, wherein said vehicle comprises a watercraft.

* * * * *